United States Patent Office 3,324,126
Patented June 6, 1967

3,324,126
PRODUCTION OF 5-TRIFLUOROMETHYLURACIL
Mathias P. Mertes, Lawrence, Kans., and Souheil E. Saheb, St. Louis, Mo., assignors to Kansas University Endowment Association, Lawrence, Kans., a corporation of Kansas
No Drawing. Filed Aug. 7, 1963, Ser. No. 300,696
11 Claims. (Cl. 260—260)

This invention relates to an improved method of producing fluorinated organic compounds obtained by the procedure of reacting an azine with a fluoride in the presence of a catalyst and recovering the fluorinated azine from the reaction product. The process is a relatively simple, inexpensive, one-step reaction with a yield in the range of 75% to 80%.

Efforts in the past to produce fluorinated azine compounds by using sulfur tetrafluoride have resulted in either total failure, or required multi-step processes giving low yields. For example, C. Heidelberger et al. reported the synthesis of 5-trifluoromethyluracil and 5-trifluoromethyl-2'-deoxyuridine in the Journal of the American Chemical Society, vol. 84, page 3597. However, his method consisted of a five-step process resulting in a yield of only 8%, a very time consuming and expensive procedure. Other efforts to produce fluoro analogs have met with little success apparently because of failure to use the right reactants, adequately control the reaction temperature, or failure to use a proper catalyst.

Interest in fluoro compounds and in particular, fluoro analogs of many of the naturally occurring pyrimidines has increased in the past several years because of their apparent tumor inhibiting qualities. Samples of 5-trifluoromethyluracil and 5-trifluoromethyl-2-deoxyuridine have indicated these fluoro compounds exhibited tumor inhibiting qualities. However, there was a definite need for development of a process of producing fluorinated azine of the type specified above in commercially feasible amounts, at reasonable cost and a satisfactory degree of purity.

It has now been found that sulfur tetrafluoride, a compound which was first isolated and identified in 1954, is particularly useful in the synthesis of fluorinated azines because of the fact that compounds of this general type can be prepared by a single step reaction when a suitable catalyst is used for the $SF_4$. Although sulfur tetrafluoride has found some utility as a reagent and chemical intermediate, it was not heretofore known that this compound has important utility in the simple, inexpensive and rapid commercial production of fluorinated azines.

It is the primary object of this invention to provide a commercially feasible method of producing a fluorinated azine compound wherein the yield obtained is substantially higher than with previously suggested processes.

It is a further object of the invention to provide a one-step method of producing a fluorinated azine in a relatively simple manner and without the utilization of special equipment.

It is still a further object of this invention to provide a method of producing a fluorinated organic compound having a ring structure by substituting a fluorine radical for a carboxyl or carbonyl radical on an oxo-azine compound by utilizing a catalyzed, highly reactive fluoride as one of the reactants.

In accordance with the preferred process for producing 5-trifluoromethyluracil, uracil-5-carboxylic acid is reacted with sulfur tetrafluoride in the presence of hydrofluoric acid as a catalyst and the reaction product then recovered from the reaction mass. A specific example of this process is as follows. 5.00 grams (0.032 mole) of uracil-5-carboxylic acid and 2.50 grams of water (0.139 mole) were placed in a 300 ml. steel bomb. The bomb was sealed and cooled to about $-70°$ C. in Dry Ice-acetone bath. The necessity of cooling the reactant vessel was to effectuate the transfer of sulfur tetrafluoride from its storage container to the reactant vessel. $SF_4$ must be kept under considerable pressure because of its low boiling point of $-38°$ C. The storage container for the $SF_4$ and the steel bomb were connected by suitable tubular connective means and the lowering of the temperature of the steel bomb created a partial vacuum in the bomb thereby pulling a quantity of the $SF_4$ gas into the reactant vessel. Approximately 45 to 50 grams of $SF_4$ (0.41 mole) were added to the reactant vessel in this manner.

The bomb was next agitated overnight to promote the reaction and allowed to warm to room temperature during this period. The bomb and contents were then heated to 100° C. and maintained at this elevated temperature for sixteen hours, then the reaction mass was allowed to cool to room temperature. The temperature of this reaction is somewhat critical and the reaction should be conducted at an elevated temperature; however, the time does not appear to be critical, and heating is continued until the reaction is completed. Successful results were obtained by heating at 68° C. for 36 hours and at 100° C. for seven hours. Thus, any heat-time combination necessary to complete the reaction is sufficient.

The chemical reaction in the above procedure is shown by the following representation:

(1)
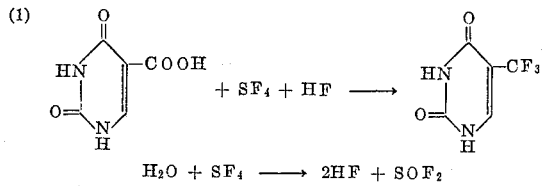

$$H_2O + SF_4 \longrightarrow 2HF + SOF_2$$

Thus, it can be seen that the carboxyl (—COOH) radical is replaced by a trifluoromethyl (—CF$_3$) radical. It is believed the reaction proceeds in two steps, first, the formation of the acyl fluoride, and secondly, by the replacement of the carbonyl oxygen with fluorine atoms.

(2)
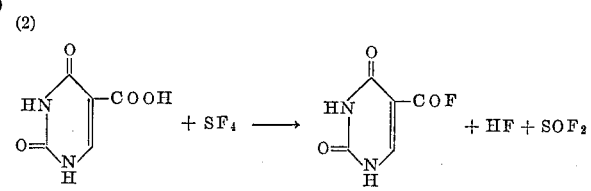

(3)
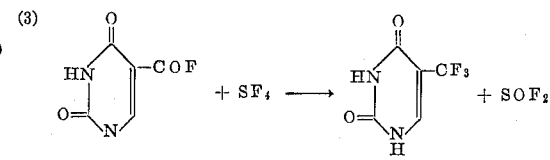

After the reaction had ceased (approximately 16 hours at 100° C.) the bomb and contents were allowed to cool to room temperature. The volatile gases formed during the reaction, hydrogen fluoride and thionyl fluoride, were exhausted from the bomb through vent means provided in the bomb for this purpose. Excess quantities of $SF_4$ were also vented in this manner. These volatile gases were decomposed in a 10% potassium hydroxide solution.

The fuming greenish liquid remaining in the bomb after evacuation of the volatile gases, was removed and evaporated. Care was taken to properly exhaust the HF given off in this step. The solid residue remaining after evaporation was dissolved in water, decolorized with charcoal and recrystallized. Repeated concentration of the mother liquor gave a yield of 4.63 g. of product, or an 81% yield. Sublimation at 160° C. yielded 4.42 g. of material, or a 77% yield.

It is apparent in Equation 1 above that the reaction is catalyzed by hydrogen fluoride formed by the reaction of $SF_4$ and the water present in the bomb. However, fluorides such as $BF_3$, $AsF_3$, $PF_5$, $TiF_4$, $SbF_3$, $SbF_5$, $HgF_2$, $SnF_2$, and other metallic fluorides may be used, as well as any Lewis acid catalysts. The greater the Lewis acid strength of the inorganic fluoride, the more pronounced will be its catalytic activity.

If a catalyst other than hydrogen fluoride is used, it is not necessary to conduct the reaction in a steel bomb, as the protective measures needed for HF are not required. Suitable reactant vessels chemically resistant to the substances utilized is the only requirement. Also, if a catalyst other than HF is desired, addition of water to the reactant vessel may not be necessary.

Other fluoride compounds may be substituted for $SF_4$. An aryl sulfur trifluoride and phenyl sulfur trifluoride give the same fluoride substitution on the azine ring structure. If phenyl sulfur trifluoride is used, the volatile gases are decomposed after the reaction by alkaline reagents such as sodium carbonate. Other substituted heterocyclics may also be used as reactants, and this process is not limited to the utilization of uracil-5-carboxylic acid. Equally successful results can also be obtained with the present process by using other substituted heterocyclic compounds such as cytosine-5-carboxylic acid, 6-azauracil-5-carboxylic acid or 5-formyluracil in accordance with the following equations:

(4) 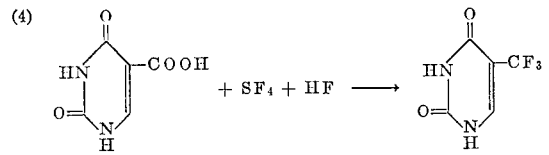

(5) 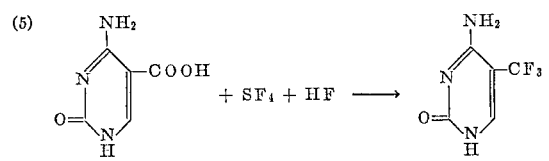

(6) 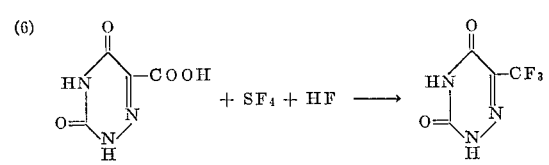

When the racial to be replaced is a carbonyl (—CH=O) as in 5-formyluracil, a difluoro substitution occurs, as in the equation below:

(7) 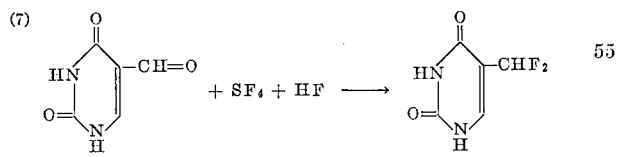

The simple one-step process of the present invention requires no elaborate equipment or apparatus. Yields are greatly improved over earlier attempts to produce compounds of this type, and the method provides a convenient way of producing commercial quantities of these compounds for tumor inhibiting applications and other uses.

Having thus described the invention, what is claimed as new and desired to be secured by Letters Patent is:

1. A method of producing 5-trifluoromethyluracil comprising the steps of:
   (1) reacting uracil-5-carboxylic acid with a compound containing a fluoride radical in the presence of a catalyst therefor at a temperature below the decomposition temperature of said compound; and
   (2) recovering the fluorinated azine from the reactants.

2. A method as set forth in claim 1 wherein said fluoride is sulfur tetrafluoride.

3. A method as set forth in claim 1 wherein said fluoride is phenyl sulfur trifluoride.

4. A method as set forth in claim 1 wherein said fluoride is an aryl sulfur trifluoride compound.

5. A method as set forth in claim 1 wherein said catalyst is hydrogen fluoride.

6. A method as set forth in claim 1 wherein said catalyst is a metallic fluoride.

7. A method as set forth in claim 1 wherein said catalyst is a Lewis acid.

8. A method of producing 5-trifluoromethyluracil comprising the steps of:
   (1) reacting uracil-5-carboxylic acid with a compound containing a fluoride radical in the presence of a catalyst therefor, while heating the reactants at a temperature below the decomposition temperature of said compound;
   (2) cooling the reactant mass to room temperature; and
   (3) recovering the fluorinated azine from said reactant mass.

9. A method of producing 5-trifluoromethyluracil comprising the steps of:
   (1) reacting uracil-5-carboxylic acid with a fluoride at an elevated temperature, and in the presence of a catalyst at a temperature below the decomposition temperature of said azine;
   (2) cooling the reaction product to room temperature and venting the volatile materials; and
   (3) evaporating the reaction product to dryness.

10. A method of producing 5-trifluoromethyluracil comprising the steps of:
    (1) reacting uracil-5-carboxylic acid azine compound having a double bond oxygen radical with a compound containing a fluoride radical in the presence of a catalyst while heating the reactants to at least about 100° C. but below the decomposition temperature of said azine;
    (2) cooling the reactant mass to room temperature and ventilating the volatile material therefrom;
    (3) evaporating the reactant mass to dryness;
    (4) dissolving the reactant mass in a liquid;
    (5) decolorizing the reactant mass with charcoal; and
    (6) recrystallizing the reactant mass.

11. A method of preparing 5-trifluoromethyluracil comprising the steps of:
    (1) admixing uracil-5-carboxylic acid, sulfur tetrafluoride and a fluoride catalyst therefor under favorable reaction conditions; and
    (2) recovering 5-trifluoromethyluracil from the admixture after the reaction has gone to substantial completion.

References Cited

UNITED STATES PATENTS 3,122,542  2/1964  Knusli et al. _____ 260—248 X
3,162,632  12/1964  Olstowski _____ 260—248

OTHER REFERENCES

Hasek et al.: J. Am. Chem. Soc., vol. 82 (February 1963) pp. 543–60.

Mertes et al.: J. Pharm. Sci., vol. 52 (May 1963) pp. 508–9.

WALTER A. MODANCE, *Primary Examiner.*

JOHN M. FORD, *Assistant Examiner.*